UNITED STATES PATENT OFFICE.

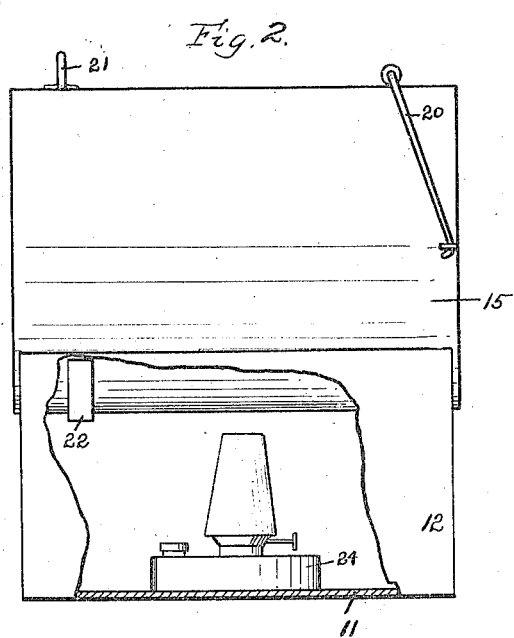
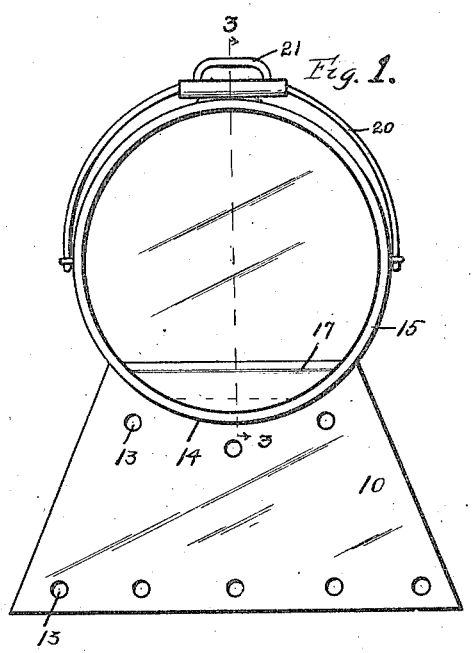
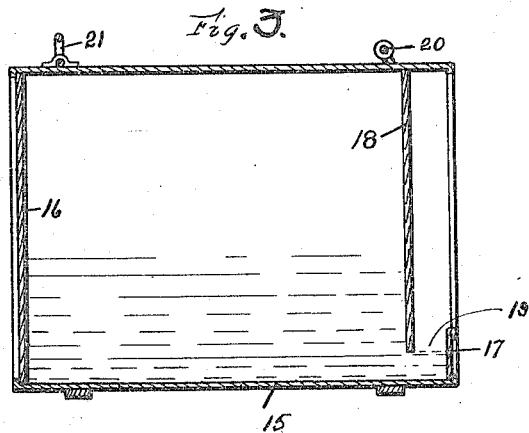
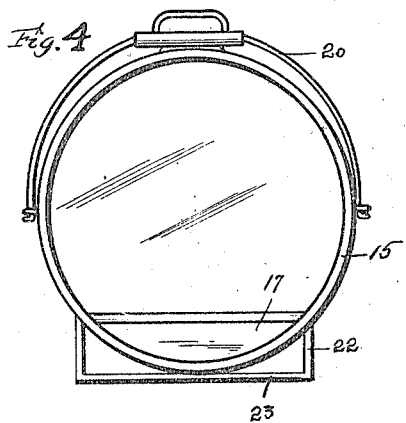

JOSEPH VORBA, OF GLADBROOK, IOWA.

CHICKEN-WATERER.

1,255,492.  Specification of Letters Patent.  Patented Feb. 5, 1918.

Application filed September 11, 1917. Serial No. 190,783.

*To all whom it may concern:*

Be it known that I, JOSEPH VORBA, a citizen of the United States, and resident of Gladbrook, in the county of Tama, and State of Iowa, have invented a certain new and useful Chicken-Waterer, of which the following is a specification.

The object of my invention is to provide a chicken waterer of simple, durable and inexpensive construction.

More particularly it is my object to provide a chicken waterer having a lower supporting member adapted to form a compartment for a heating element and to serve as a proper support for the water container, and in connection therewith to provide a water container having the form of a cylindrical tank or bucket, adapted to rest upon said support and to be held against rotation thereon, and having its parts so arranged that a trough is formed at its lower forward end and so that the tank may be quickly and easily removed and stood on one end for convenience in filling.

With these and other objects in view, my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a front elevation of a chicken waterer embodying my invention.

Fig. 2 shows a side elevation of the same, part of the base or supporting member being broken away.

Fig. 3 shows a detail, sectional view, taken on the line 3—3 of Fig. 1, and

Fig. 4 shows a front elevation of the tank removed from the base.

In the illustration of my invention shown in the accompanying drawings, I have used the reference numeral 10 to indicate generally the front wall of the base or supporting member of my improved chicken waterer. The base has the bottom 11, the rear wall similar to the wall 10, and side walls 12 connected with the bottom and end walls and extending upwardly and inwardly toward each other, as illustrated in Figs. 1 and 2.

The front wall 10 is provided near its upper edge and also near its lower edge, with pluralities of openings 13 for ventilation. The front and rear walls are formed with their upper edges curved at 14 to fit the cylindrical tank hereinafter described.

There is provided as a part of my improved chicken waterer a cylindrical tank or bucket member 15, having at one end a bottom 16 and having its other end open except that at the lower portion of the tank 15 at its open end there is a narrow wall 17 extending across the tank from side to side and forming a trough at the bottom of the front of the tank 15. Near its forward open end the tank 15 is provided with a partition 18 arranged parallel with the bottom 16 and extending across the tank 15 to position spaced from but overlapping the member 17, as illustrated in Fig. 3. Thus it will be seen that there is formed in the lower front part of the tank a trough 19 into which the lower edge of the partition 18 extends for forming a water seal.

Secured to the upper portion of the tank 15 is an ordinary bail handle 20, and secured to the outside of the wall of the tank 15 on the upper side thereof near the rear end of the tank, is a pivoted handle 21.

Secured to the lower part of the tank 15 is a pair of supporting members, each comprising opposite, spaced, parallel downwardly extending arms 22 connected at their lower ends by a transverse bar 23 which preferably engages the bottom of the tank 15, as illustrated in Fig. 4.

The supporting members just described serve a double function. They are arranged to fit just inside the side walls 12 of the base of the device and to hold the cylindrical tank from rotation when it is supported on the base, and are also adapted to serve as means for firmly supporting the tank on the ground if it is desired to use the tank alone (for instance, in summer) without the base.

Within the base I use a heating element 24 which may be of any suitable construction.

In the practical use of my improved chicken waterer, where the device is used during cold weather and the base and tank are employed together, the tank 15 is removed from the base and placed in position resting on the bottom or rear end member 16. Water may be poured on to the partition 18, and the part of the wall of the tank above the partition 18 forms a flange for preventing water from splashing out. The water will flow downwardly freely through the trough 19.

The heating element 24 is lighted and placed in the base, and thereupon the tank is grasped by the handles 20 and 21 and tilted to the position shown in Fig. 2, and is placed on the base with the supporting members within the base and with the members 22 engaging or resting adjacent to the upper edges of the walls 12.

It will be noted that the shape of the tank 15 is such that it can be made at a very low price. In this connection attention is called to the fact that the cylindrical tank can be made of ordinary tin or sheet metal cheaper than an ordinary tank.

On account of the use of the supporting members, the tank may be rested on the base and held against rotation thereon by the members 22 and 23, or may be removed from the base and supported on said supporting members on the ground for use for feeding little chickens or whenever it is not desired to use the base, or the tank may be placed on its bottom for filling or carrying water from one place to another.

The entire device is of comparatively simple and inexpensive construction, and affords a convenient and handy waterer for use during cold weather when it is desired to heat the water for the chickens.

Some changes may be made in the construction and arrangement of the various parts of my improved chicken waterer without departing from the essential features and principles of my invention, and it is my intention to cover by my present application, any modified forms of structure or use of mechanical equivalents which may be reasonably included within the scope of my claim.

I claim as my invention:

A waterer comprising a hollow base, having side and end walls, the side walls being inclined from their lower edges upwardly and toward each other, said end walls being curved to receive and support a tubular tank, a tubular tank resting upon the curved end walls of said base having supporting members thereon adapted to engage the side walls of said base for preventing rotation of the tank, and adapted also to support the tank on a flat surface, said tank having a trough at its forward end, a partition extending downwardly to position below the upper edge of said trough, and a heater in said base.

Des Moines, Iowa, August 31, 1917.

JOSEPH VORBA.